(12) United States Patent
Chen (10) Patent No.: US 9,498,027 B2
(45) Date of Patent: Nov. 22, 2016

(54) PULL TAB AND METHOD OF MANUFACTURING A PULL TAB

(71) Applicant: Duraflex Hong Kong Limited, Sheung Wan (HK)

(72) Inventor: Te Chien Chen, Tsuen Wan (HK)

(73) Assignee: Duraflex Hong Kong Limited, Sheung Wan (HK)

( * ) Notice: Subject to any disclaimer, the term of this patent is extended or adjusted under 35 U.S.C. 154(b) by 204 days.

(21) Appl. No.: 14/325,483

(22) Filed: Jul. 8, 2014

(65) Prior Publication Data

US 2016/0007692 A1 Jan. 14, 2016

(51) Int. Cl.
*A44B 19/26* (2006.01)
*A44B 19/42* (2006.01)
*F16G 11/00* (2006.01)

(52) U.S. Cl.
CPC .............. *A44B 19/262* (2013.01); *A44B 19/42* (2013.01); *F16G 11/00* (2013.01)

(58) Field of Classification Search
CPC .................. A44B 19/262; A44B 19/42; F16G 11/00; B29C 2793/0027; B29C 45/14016; B29C 41/14426; B29C 45/14573; B29L 2005/00; B29D 5/00
USPC ............... 264/142, 143, 157, 159, 275, 251, 264/271.1, 121, 126.1
See application file for complete search history.

(56) References Cited

U.S. PATENT DOCUMENTS

| 3,290,080 A | 12/1966 | Dawson |
| 3,831,474 A | 8/1974 | Perlman |
| 3,975,040 A | 8/1976 | Van Gompel |
| 4,093,288 A | 6/1978 | Suzuki |
| 4,636,347 A * | 1/1987 | Kato ................. B29C 45/14549 264/154 |
| 5,347,692 A * | 9/1994 | Ebata .................... A44B 19/262 24/419 |
| 5,416,951 A | 5/1995 | Keyaki et al. |
| 5,535,491 A | 7/1996 | Allport |

(Continued)

FOREIGN PATENT DOCUMENTS

WO 2011/139546 A1 11/2011

OTHER PUBLICATIONS

International Search Report and Written Opinion of the International Searching Authority of PCT/CN2015/083014, mailed Oct. 13, 2015.

*Primary Examiner* — Christopher Besler
*Assistant Examiner* — Jun Yoo
(74) *Attorney, Agent, or Firm* — Collard & Roe, P.C.

(57) ABSTRACT

A pull tab for zippers is formed by a cord having a cord retaining member attached to one end of the cord and a socket in the top surface of the cord retaining member, and a plug attached to other end of the cord. The plug has a shape corresponding to the shape of the socket, so that the plug can fit securely within the socket, thus, forming a loop with the cord. A slidable locking device is placed around the cord, the locking device having an interior cavity corresponding to the shape of the cord retaining member, such that placing the plug into the socket and sliding the locking device over the cord retaining member locks the second end of the cord to the cord retaining member. In a method for manufacturing the pull tab, the plug and cord retaining member are continuously overmolded in one piece on a length of the cord, and then cut into pieces to form completed pull tabs.

7 Claims, 8 Drawing Sheets

(56) References Cited

U.S. PATENT DOCUMENTS

| | | | |
|---|---|---|---|
| 5,632,076 | A | 5/1997 | Ervin et al. |
| 5,860,192 | A | 1/1999 | Chung |
| 6,321,434 | B1 * | 11/2001 | Kubota ............. B29C 45/14549 264/152 |
| 6,440,339 | B1 * | 8/2002 | Magidson ............... A61F 11/08 264/157 |
| 7,264,287 | B2 | 9/2007 | Ching |
| 7,360,806 | B2 | 4/2008 | Ching |
| 8,910,351 | B2 | 12/2014 | Iannello et al. |
| 2009/0265899 | A1 | 10/2009 | Yang |
| 2013/0104348 | A1 | 5/2013 | Wang |

* cited by examiner

PULL TAB AND METHOD OF MANUFACTURING A PULL TAB

BACKGROUND OF THE INVENTION

1. Field of the Invention

The present invention relates to a pull tab for zippers, as well as a method for manufacturing a pull tab. In particular the invention relates to a pull tab that can be applied directly to the zipper head, and to a manufacturing method for continuously overmolding a cord to form the pull tab.

2. The Prior Art

Pull tabs for zippers are usually formed by metal plates having an aperture in which the zipper head is mounted. These metal plates are often too small to allow for easy sliding of the zipper. This is especially true when the zipper pull becomes wet and slippery. Therefore, many manufacturers attach a cord having a larger pull on the end to the existing zipper pull. However, these additional cords are often too long to make pulling easy, and the manufacturing process is expensive and time consuming.

SUMMARY OF THE INVENTION

It is therefore an object of the invention to provide a zipper pull that can be applied directly to the zipper head, can be customized for a variety of sizes and decorations, and which can be produced simply and economically.

These and other objects of the invention are accomplished by a pull tab formed by a cord having a cord retaining member attached to one end of the cord and a socket in the top surface of the cord retaining member, and a securing device formed by a plug attached to other end of the cord. The plug has a shape corresponding to the shape of the socket, so that the plug can fit securely within the socket, thus forming a loop with the cord. Instead of a plug/socket attachment, any other suitable way to attach the end of the cord to the cord retaining member could also be used. A slidable locking device is placed around the cord, the locking device having an interior cavity corresponding to the shape of the cord retaining member, such that placing the plug into the socket and sliding the locking device over the cord retaining member locks the second end of the cord to the cord retaining member. The slidable locking device can be formed so that it snaps over the cord retaining member, or is held there with a friction fit.

The cord can be a woven cord, and the cord retaining member and plug are then over-molded onto the woven cord.

The cord retaining member can be formed in several shapes. In one embodiment, the socket is formed so that it extends through a proximal end of the cord retaining member. Thus, the cord is simply folded in a U-shape and the plug is placed in the socket, so that both ends of the cord are facing in the same direction.

In another embodiment, the socket can be formed extending through a proximal end of the cord retaining member, and/or with a slot for the cord extending through the distal end. In one embodiment, the second end of the cord is locked by placing the cord through the slot and placing the plug in the socket such that the two ends of the cord extend in opposite directions. In this embodiment, the cord is looped around the bottom of the cord retaining member. Preferably, there is a channel in the bottom surface of the cord retaining member for accommodating the cord when the slidable locking device is slid over the cord retaining member.

The slidable locking device can be made in any desired shape and made of any desired material. The locking device can be molded in two parts, which are then fused together.

The plug and socket have corresponding shapes, so that the plug fits securely within the socket. In one embodiment, the plug has a plurality of grooves and the socket has a plurality of protrusions corresponding to the grooves. This way, the protrusions prevent the plug from exiting the socket, even under force. In another embodiment, the plug and socket have a trapezoid shape. The wider end of the trapezoid is placed facing the direction of force, so that the plug cannot be inadvertently pulled out of the socket. Any other suitable set of corresponding shapes could be molded for the plug and socket as well.

The pull tab of the present invention can be applied directly to a zipper head without the need for a traditional zipper pull. This reduces cost and labor in manufacturing consumer items. The cord could be made to any desired length, depending on the needs of the end user.

The method for manufacturing the pull tab described above eliminates waste and labor by using a continuous molding process for a large number of pull tabs. Traditionally, each length of cord was required to be cut, the ends burned, and then individually molded onto the pull tab. In the present invention, a mold is used that has a mold cavity corresponding to a plug and a cord retaining member connected to each other. The cord is fed in from a reel so that the cord extends through the mold cavity. A channel can be made in the mold outside the mold cavity for the cord. Mold material is then injected into the mold cavity to form molded components around the cord. After the cord with the molded components is removed from the mold, the molded components are cut at a predetermined cutting point to form a cord having a cord retaining member on one end and a plug on the other.

In the method of the present invention, the cord can be fed into the mold continuously and the molded components are continuously molded on the cord in successive molding steps. As each molding step is completed, the cord is continuously pulled through the mold to create additional components.

The cutting of the components preferably occurs using a heated knife. This avoids any excess flashing being left on the molded components.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
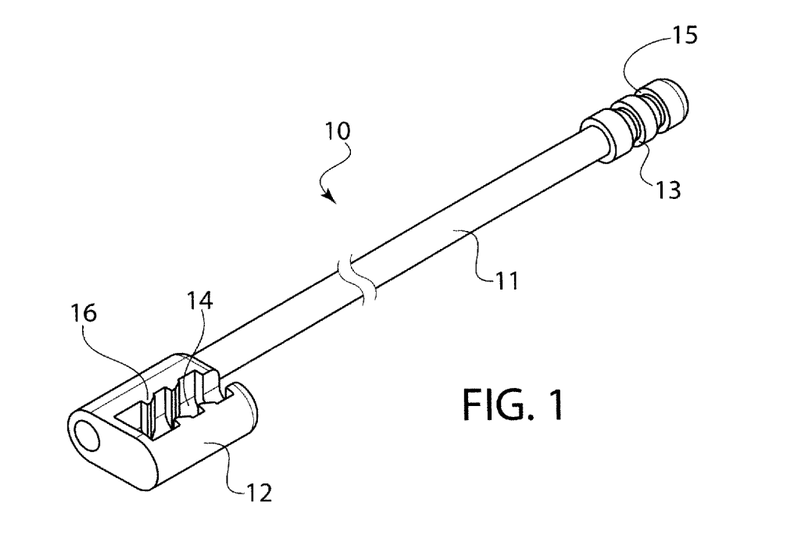
FIG. 1 shows a perspective view of a first embodiment of a pull tab according to the invention, in an unfolded configuration.
Figure 2:
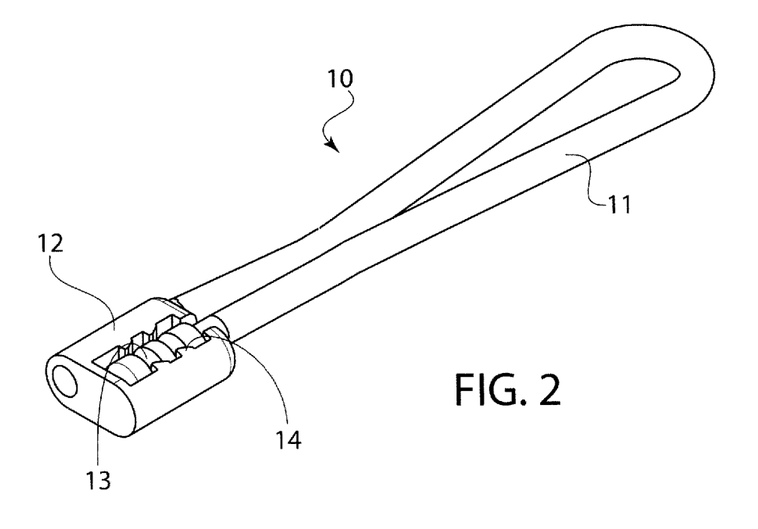
FIG. 2 shows the pull tab of FIG. 1 with the plug inserted into the socket.

Referring now in detail to the drawings and, in particular, FIGS. 1 and 2 show a first embodiment of a pull tab 10 according to the invention. Pull tab 10 is comprised of a cord 11 having a cord retaining member 12 at one end and a plug 13 at the other end. Cord retaining member 12 and plug 13 are both over molded onto cord 11, which can be a woven cord made of any suitable material. Cord retaining member 12 has a socket 14 molded therein, for receiving plug 13 when cord 11 is folded over itself, as shown in FIG. 2. In order to ensure a secure fit of the plug 13 into socket 14, plug 13 has a series of grooves 15 encircling it, and socket 14 has a series of corresponding protrusions 16 that fit into the groove 15 when plug 13 is placed in socket 14.

Figure 3:
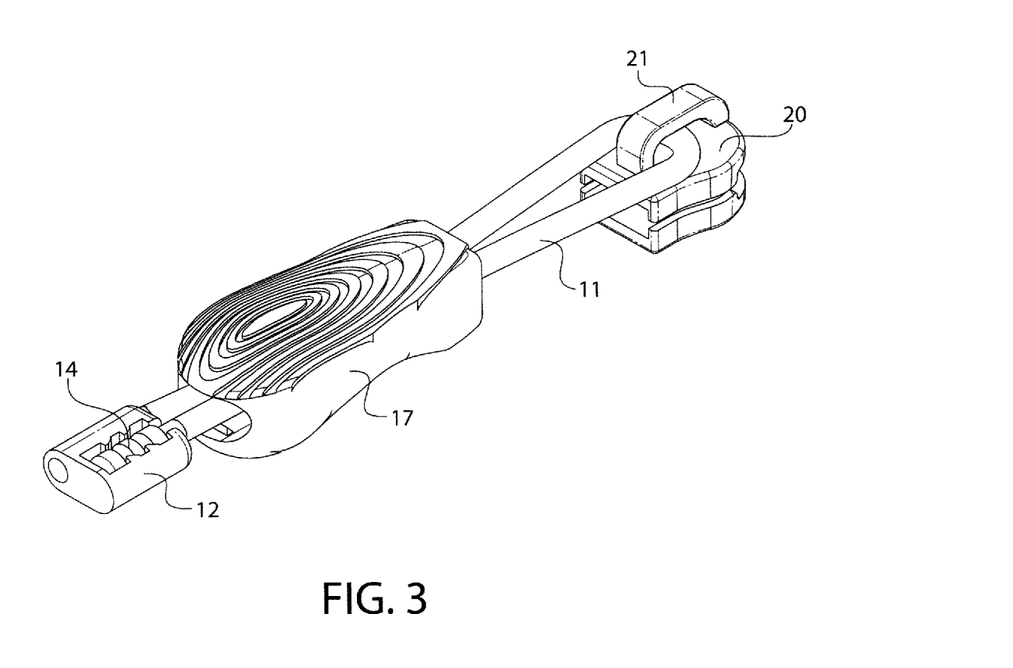
FIG. 3 shows a perspective view of the pull tab mounted on a zipper head with a slidable locking device attached thereto.
Figure 4:
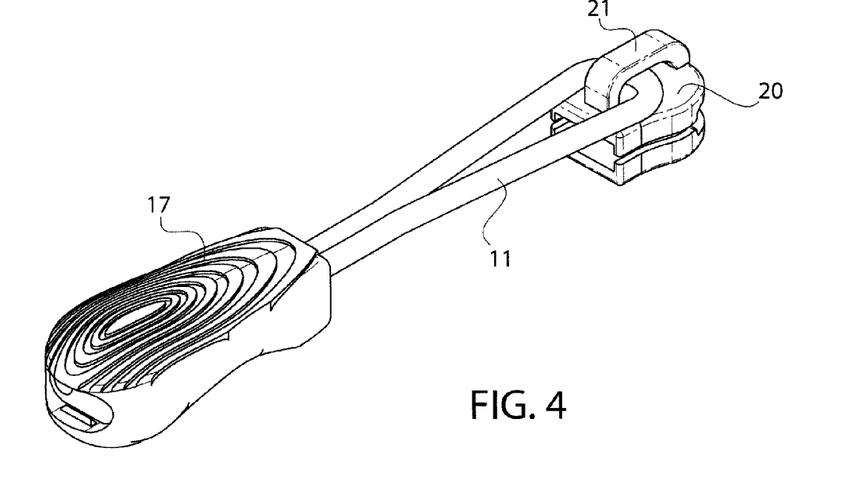
FIG. 4 shows the pull tab of FIG. 3 with the locking device locked over the cord retaining element.
Figure 5:
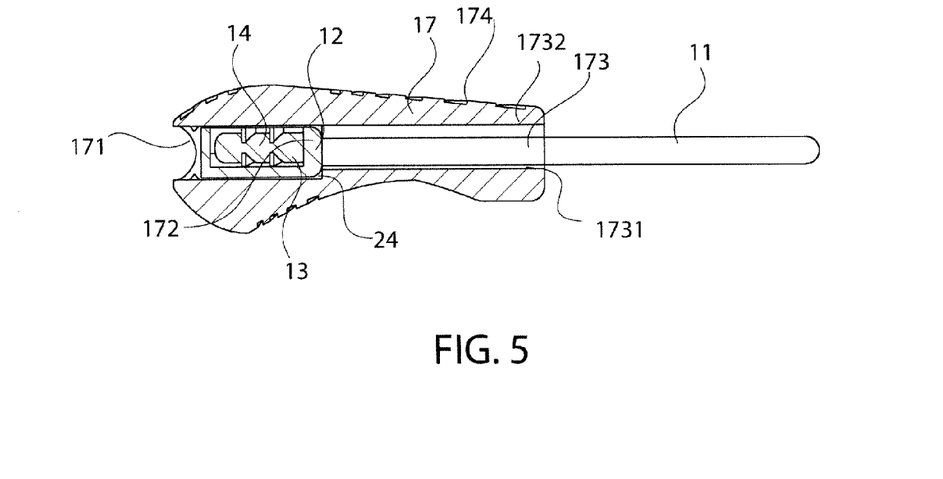
FIG. 5 shows a cross-sectional view of the locking device along lines V-V of FIG. 4.
Figure 6:
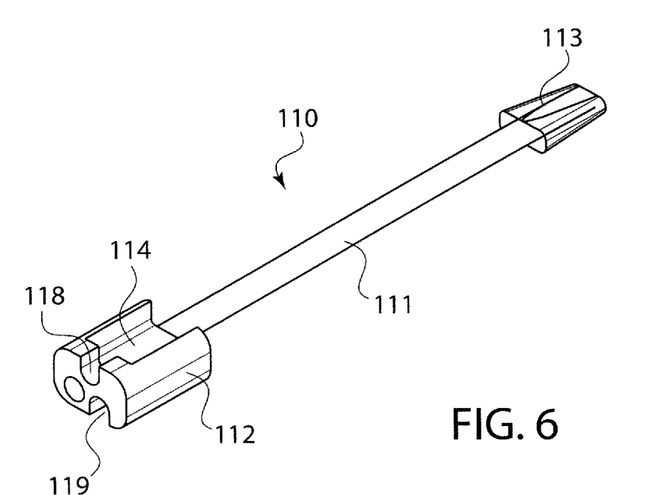
FIG. 6 shows an alternative embodiment of the pull tab according to the invention.
Figure 7:
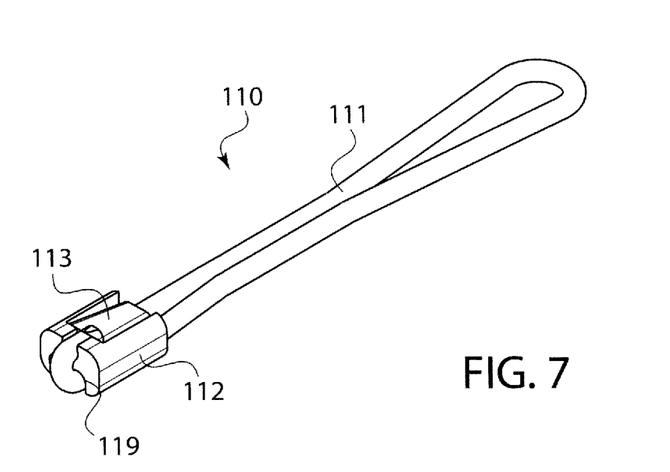
FIG. 7 shows the embodiment of FIG. 6 with the plug inserted into the socket.

To attach pull tab 10 to a zipper head 20, plug 13 is first threaded through a slidable locking cover 17 and then through the bar 21, back through slidable locking cover 17, and finally placed in socket 13, as shown in FIG. 3. Then, locking cover 17 is slid down over cord retaining member 12 to lock plug 13 into socket 13, as shown in FIGS. 4 and 5. Locking cover 17 can be molded in any desired shape and from any desired material. As shown in FIG. 5, the interior cavity 24 of locking cover 17 has a shape that conforms to the shape of cord retaining member 12, so that cord retaining member 12 is securely held by locking cover 17, as shown in FIG. 5. Locking cover 17 is equipped with a stop 172 on the proximal end, and another set of stops 171 on the distal end, to prevent cord retaining member from sliding out of locking cover 17, even under stress. Locking cover 17 also has an oval-shaped channel 173 for accommodating cord 11. Channel 173 has upper surface 1732 and lower surface 1731, which can be configured of any desired dimension. A smaller channel 173 can create more friction on cord 11 and give it less space to move around. Grooves 174 can be cut into the top surface of locking cover 17 to assist in sliding cover 17 over cord retaining member 12.

FIGS. 6-9 show an alternative embodiment of pull tab 10. Here, pull tab 110 is formed from a cord 111 connected to cord retaining member 112 at one end, and to plug 113 at the other end. Cord retaining member 112 has a socket 114, which conforms to the shape of plug 113. A channel 119 is formed into the underside of cord retaining member 112, to accommodate cord 111 as well. In this embodiment, plug 113 and socket 114 are in the shape of a trapezoid. However, other shapes are suitable as well.

Figure 8:
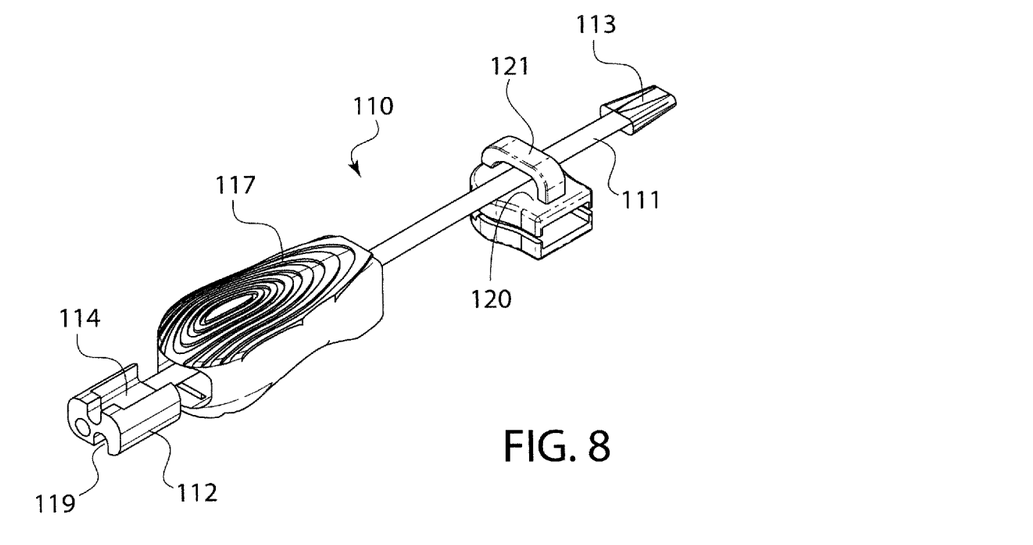
FIG. 8 shows the embodiment of FIGS. 6 and 7 being mounted on a zipper head with a slidable locking device.
Figure 9:
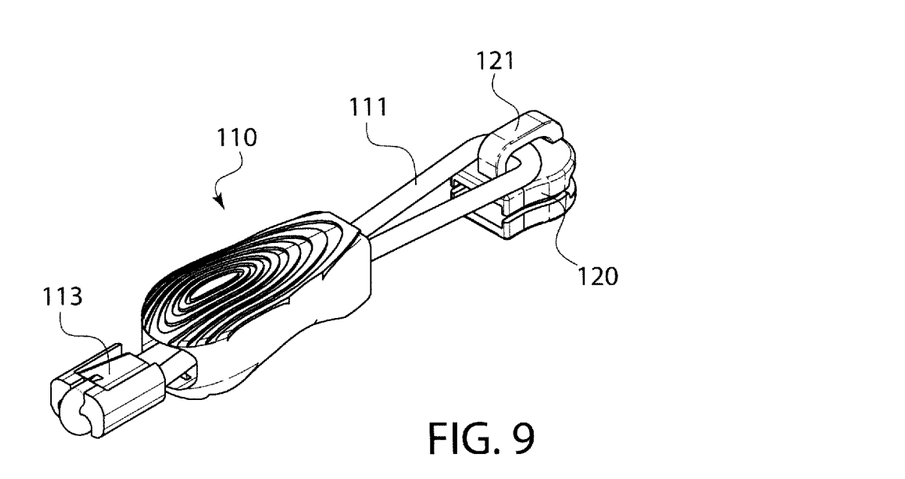
FIG. 9 shows the embodiment of FIG. 8 with the locking device being slid over the cord retaining element.

In this embodiment, plug 113 is placed in socket 114 by placing cord 111 in channel 119 on the underside of cord retaining member 112 and bringing it up and around to the top side of cord retaining member 112 for placement in socket 114. Cord retaining member 112 has a slot 118 on its top surface for accommodating cord 111 as it comes around and into socket 114. The application of pull tab 110 to a zipper head 120 is the same as with pull tab 10, as is shown in FIGS. 8-9. Here, cord 111 is fed through locking cover 117 and bar 121 of zipper head 120, and back through cover 117. Cord 111 is then placed in channel 119 on the underside of cord retaining member 112, through slot 118 and plug 113 is placed in socket 114. Then, slidable locking cover 117 is placed on cord 111 and slid down over cord retaining member 112 to lock plug 113 into socket 114. In this embodiment, pulling on cord 111 actually causes plug 114 to seat more securely into socket 114 because the proximal edges of plug 113 press against the walls of socket 114, creating a very strong and secure pull tab.

Figure 10:
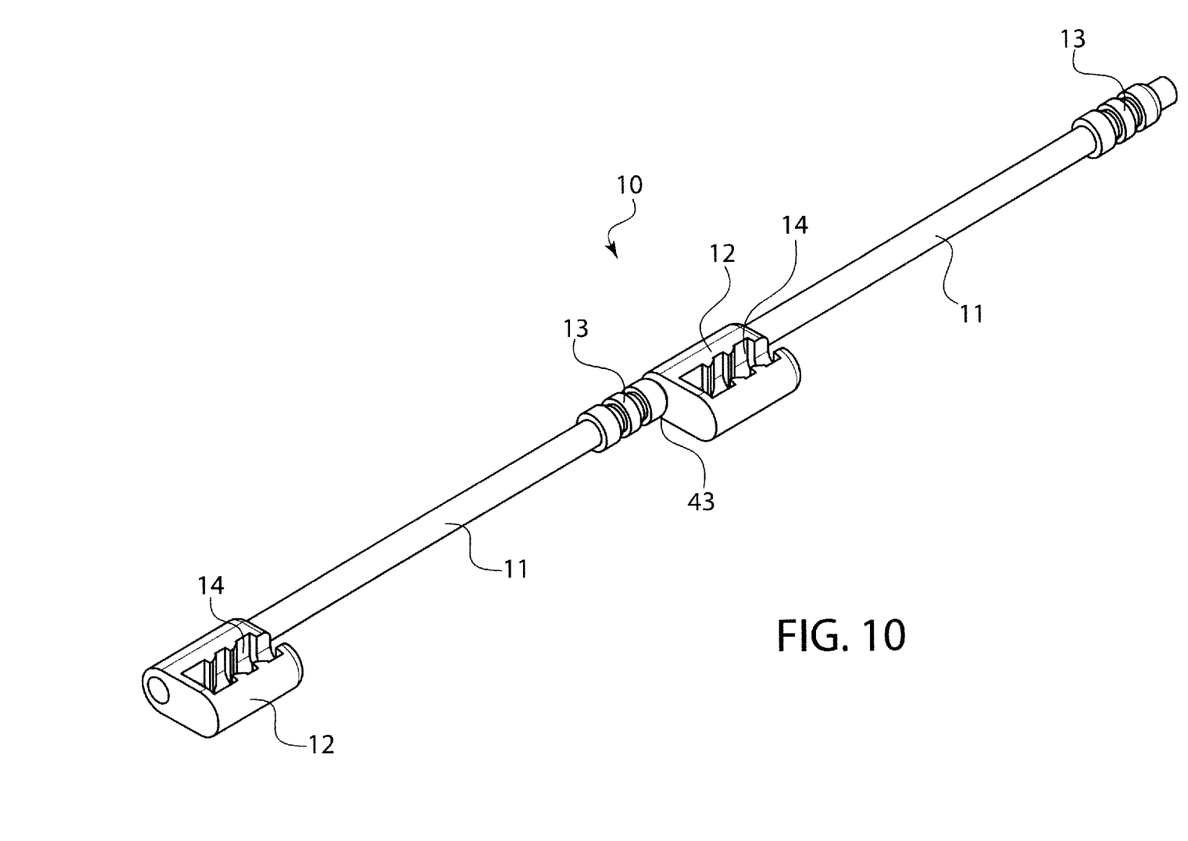
FIG. 10 shows two pull tabs of FIG. 1 after having been continuously molded in a single molding step.
Figure 11:
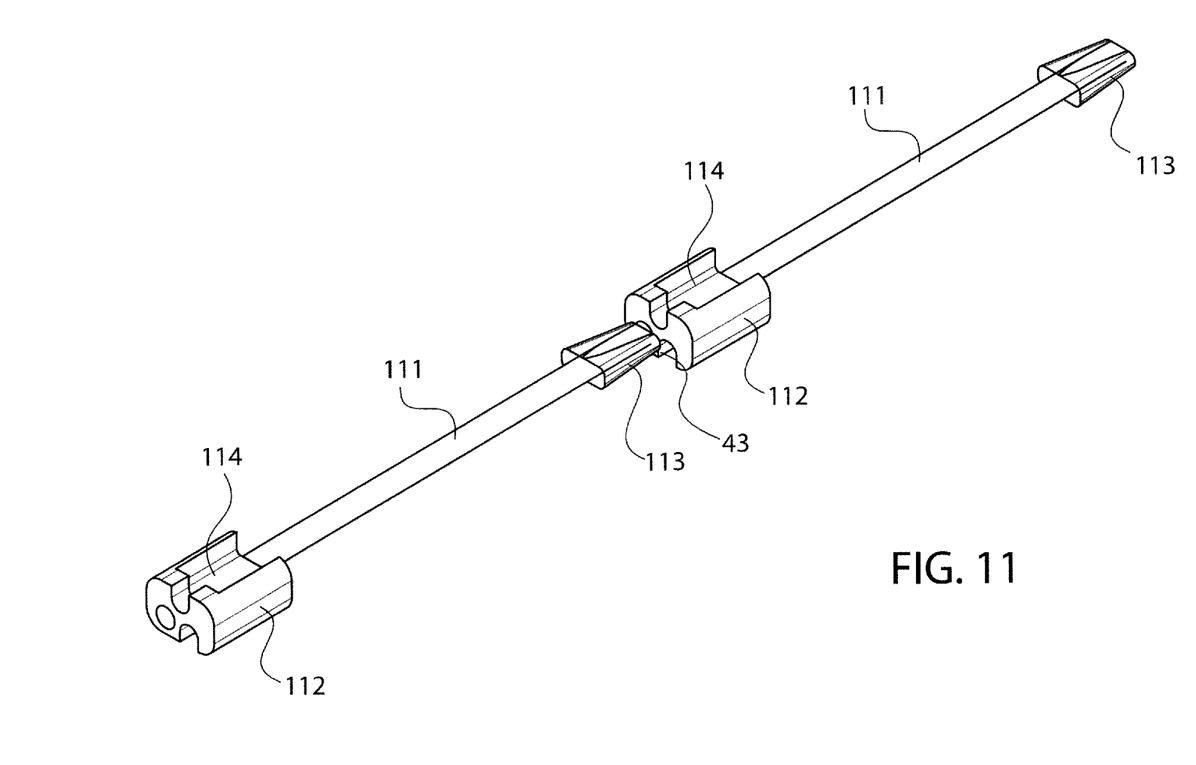
FIG. 11 shows two pull tabs of FIG. 6 after having been continuously molded in a single molding step.

To manufacture pull tab 10, 110 according to the invention, the cord retaining members and plugs are continuously over-molded onto cord 11, 111. FIGS. 10 and 11 show the two different variations of pull tabs 10, 110 during the production process. In the production process, cord retaining members 12, 112 and plugs 13, 113 are molded in one piece onto cord 11, 111. Then, the cord retaining member 12, 112 and separated from the attached plugs 14, 114 by cutting them across a dividing line 43, thus separating each pull tab 10, 110 from the continuous line.

Figure 12:
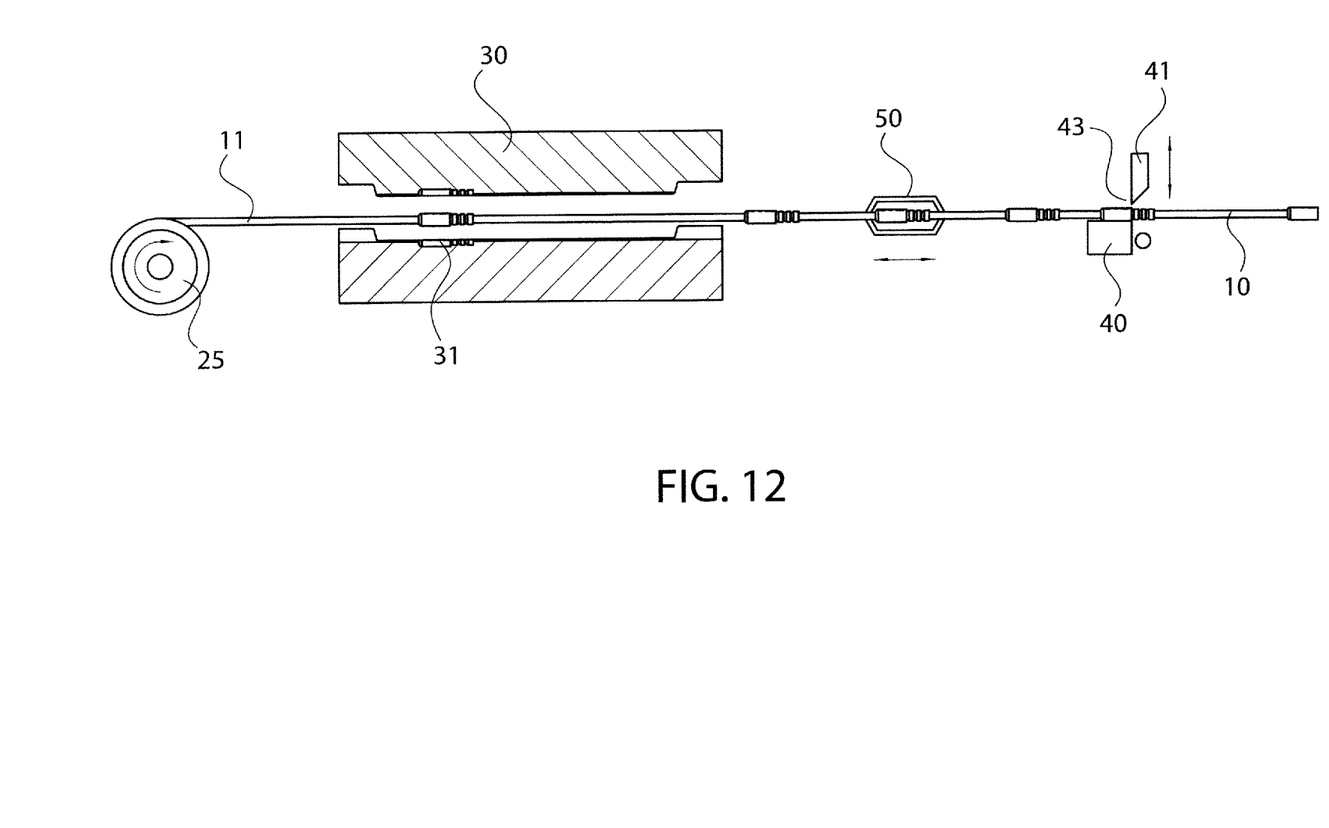
FIG. 12 shows the molding and cutting process for forming a pull tab according to the invention.

The molding process for pull tab 10 is shown in FIG. 12. Here, cord 11 is fed from a roll 25 into a mold 30 having a mold cavity 31 matching the shape of cord retaining member 12 and plug 13 connected together. Once mold material is injected into mold cavity 31 and mold 30 is separated to free cord 11, cord 11 is pulled through to a cutting station 40, where it is cut along dividing line 43 by a heated cutting blade 41, to prevent any flashing from being left on the parts. An automated cord pulling fixture 50 can be used to pull the cord along the assembly line to facilitate processing. After cutting, a completed pull tab 10 results. This production process can be entirely automated, so that a large number of pull tabs are produced quickly and efficiently, with little margin for error.

The sliding locking cover can be manufactured and assembled separately, so that it can be customized for various applications and customers.

Accordingly, while only a few embodiments of the present invention have been shown and described, it is obvious that many changes and modifications may be made thereunto without departing from the spirit and scope of the invention.

What is claimed is:

1. A method for manufacturing a pull tab, comprising:
providing a mold having a mold cavity;
feeding a cord into the mold so that the cord extends through the mold cavity;
injecting mold material into the mold cavity to form a molded component around the cord;
removing the cord with the molded component from the mold; and
cutting the molded component and the cord into pull tabs at a designated cutting point on each molded component;
wherein each molded component is comprised of a securing device and a cord retaining member, wherein cutting the molded component at the designated cutting point creates a pull tab formed by a length of the cord having a securing device at one end and a cord retaining member at the other end, and wherein the pull tab is assembled by connecting the securing device to the cord retaining member so that the cord forms a loop.

2. The method according to claim 1, further comprising the step of pulling the cord with a pulling fixture to transport the molded component from the mold cavity to a cutting location.

3. The method according to claim 1, wherein the step of feeding the cord through the mold occurs continuously and automatically and the molded components are continuously molded on the cord in successive molding steps.

4. The method according to claim 1, wherein the step of cutting takes place using a heated knife.

5. The method according to claim 1, wherein the cord is fed in from a roll.

6. The method according to claim 1, further comprising the steps of:
 placing a slidable locking device on the cord, the slidable locking device having an inner cavity corresponding to a shape of the cord retaining member, and
 sliding the slidable locking device over the cord retaining member after the securing device is connected with the cord retaining member to lock the securing device to the cord retaining member.

7. The method according to claim 1, wherein the cord retaining member comprises a socket in a top surface thereof, and the securing device comprises a plug that fits within the socket.

\* \* \* \* \*